United States Patent [19]

Pellenc

[11] Patent Number: 4,644,648
[45] Date of Patent: Feb. 24, 1987

[54] PORTABLE HYDRAULIC TOOLS

[75] Inventor: Roger J. P. Pellenc, Pertuis, France

[73] Assignee: Esablissements Pellenc & Motte, Pertuis, France

[21] Appl. No.: 585,668

[22] Filed: Mar. 2, 1984

[51] Int. Cl.⁴ .............................................. B26B 15/00
[52] U.S. Cl. .................................. 30/228; 91/358 R; 92/134; 137/312
[58] Field of Search .............. 30/228; 91/358; 92/134; 137/312

[56] References Cited

U.S. PATENT DOCUMENTS

| 2,742,929 | 4/1956 | Treseder | 92/134 X |
| 3,212,520 | 10/1965 | Carlton | 137/312 X |
| 3,707,984 | 1/1973 | Bantz | 137/312 |
| 3,893,237 | 7/1975 | Jahnke | 30/228 |

Primary Examiner—Douglas D. Watts
Attorney, Agent, or Firm—William A. Drucker

[57] ABSTRACT

A portable hydraulic tool, such as a hydraulic secateurs, is of the kind having a single acting ram including a driving piston with its piston rod connected to at least one movable operating member such as a cutting element of the tool, the piston being movable in fluid tight manner in a bore under the thrust of hydraulic fluid acting on a working face of the piston, the improvement being that there is provided a return chamber the volume of which decreases when the driving piston is displaced in its working stroke, the return chamber containing a compressible fluid under pressure such that, when the thrust exerted on the piston by the hydraulic fluid becomes less than the thrust exerted on the piston by the compressible fluid, the piston is caused to carry out a return stroke by the expansion of the compressible fluid.

14 Claims, 16 Drawing Figures

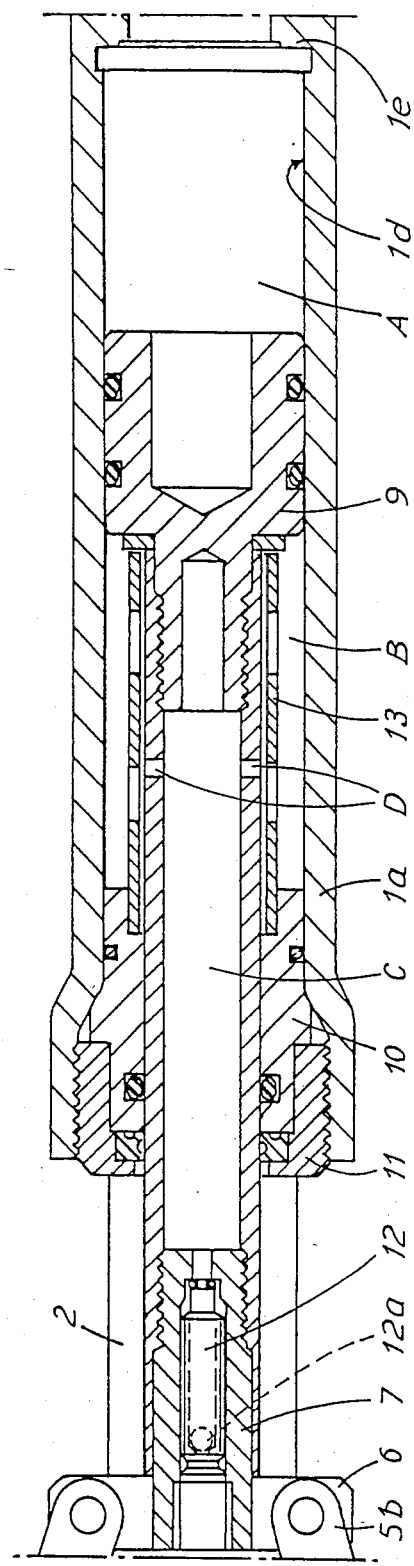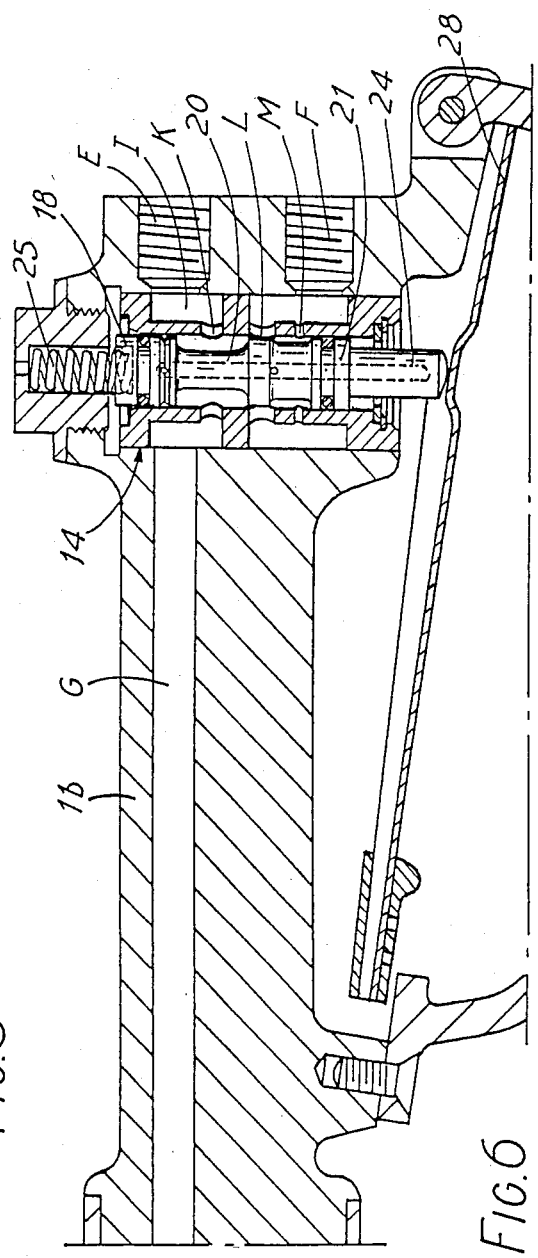

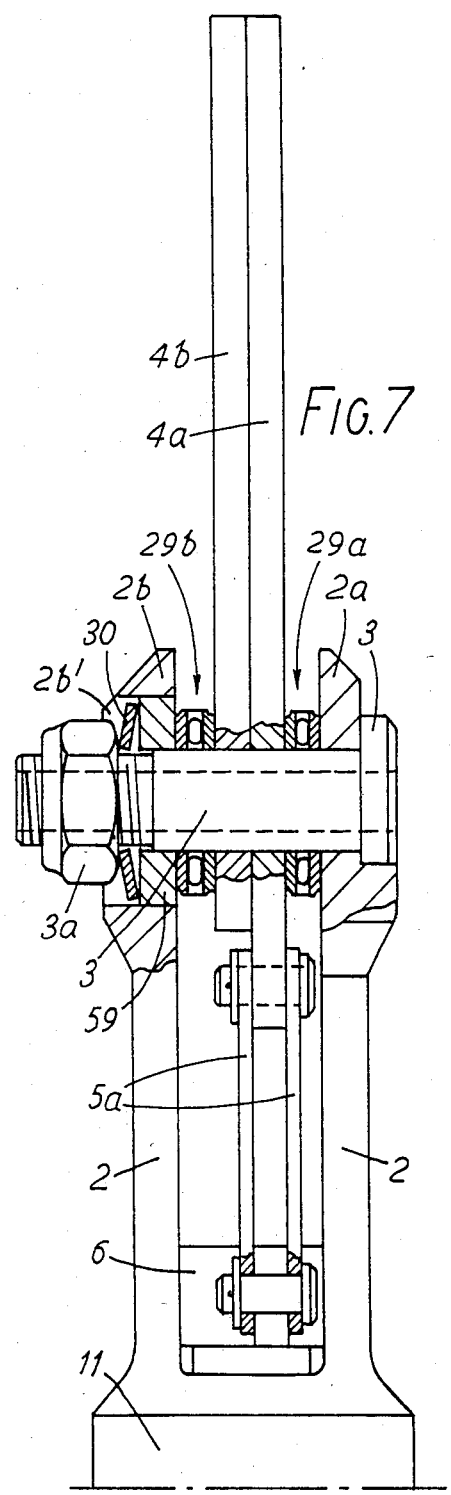
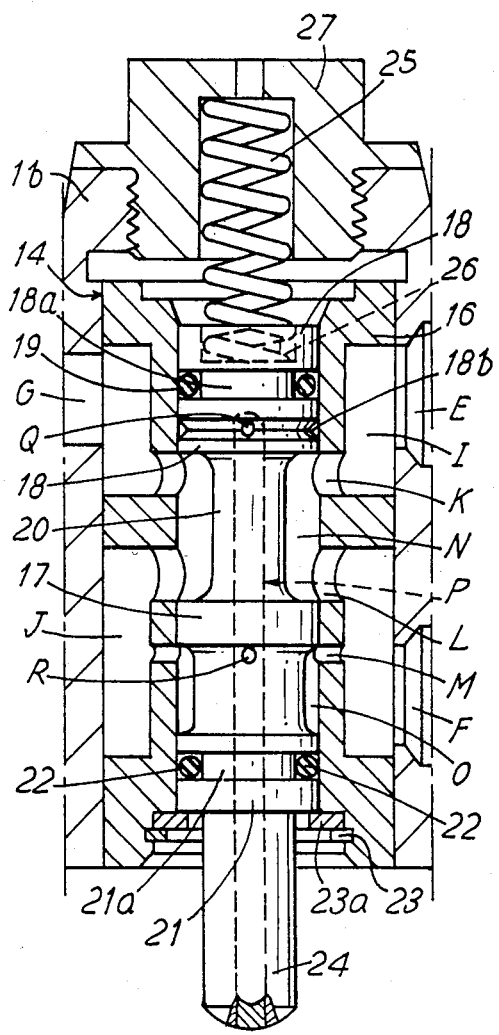
FIG.7
FIG.8

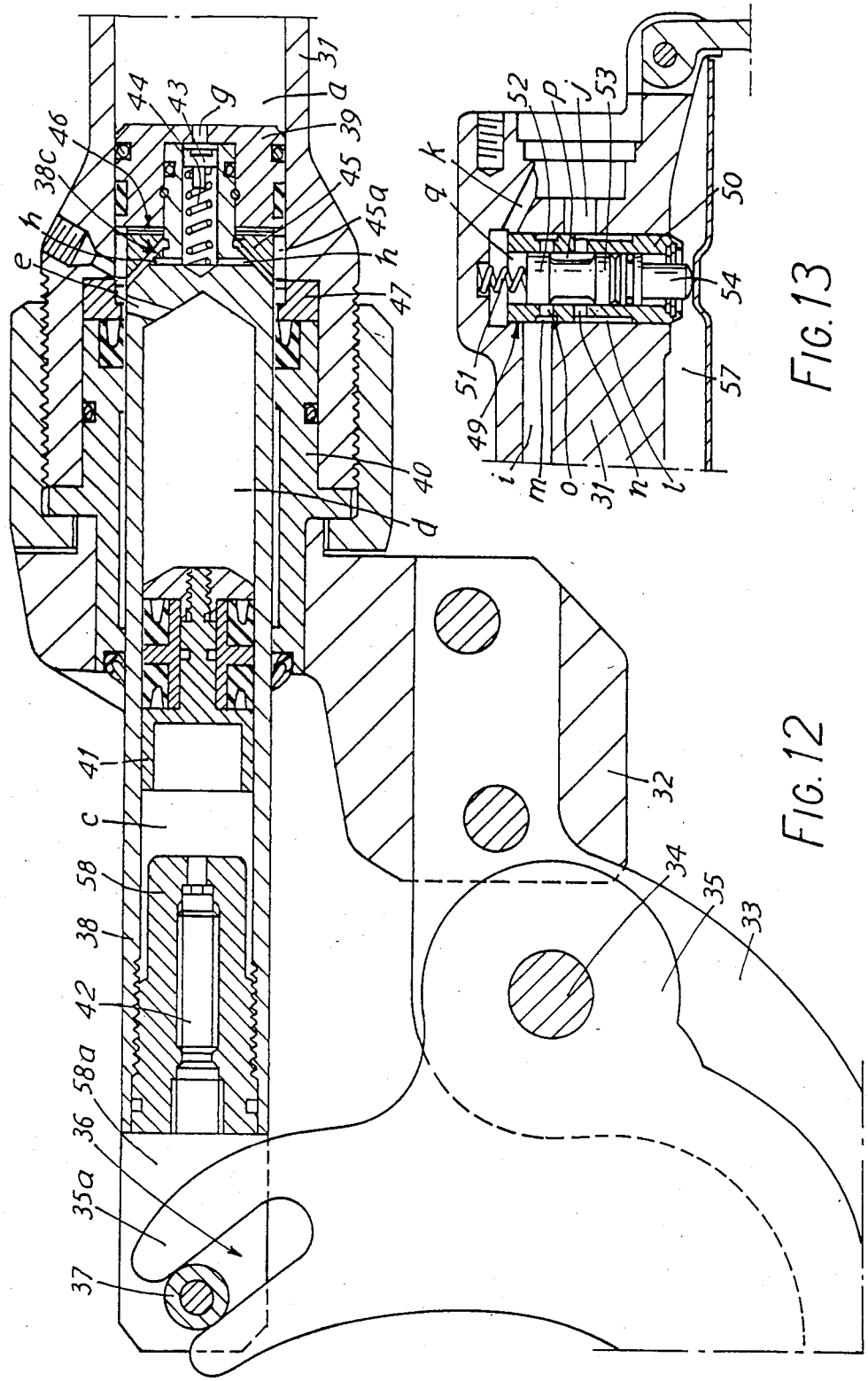

PORTABLE HYDRAULIC TOOLS

BACKGROUND OF THE INVENTION

The present invention relates to portable hydraulic tools such as, for example, hydraulic secateurs or shears comprising a hollow body at the front of which are installed two baldes of which at least one pivoting blade is actuated by a hydraulic device having a single acting ram comprising a driving piston the rod of which is coupled to the said pivoting blade, and a hydraulic distributor permitting the sending of the hydraulic fluid under pressure against the working face of the piston in order to assure the movement in the direction corresponding to the closing of the blades.

The invention likewise relates to a method or return of the piston of the ram of the said portable hydraulic tools.

PRIOR ART

Known portable hydraulic tools, for example hydraulic secateurs, generally comprise a single acting ram or a double acting ram.

In a first case (U.S. Pat. No. 4,109,381) the hydraulic fluid under pressure coming from a source of hydraulic fluid under pressure (pump, hydraulic circuit of a tractor, automotive platform or other vehicles, hydraulic equipment adaptable to a motor cultivator, hydroelectric equipment, etc.) is applied onto a single face or working face of the piston of the ram, the return of which is obtained by means of a compression spring. The presence of this latter causes a certain number of inconveniences amongst which there are to be noted particularly:

return of the piston at a non-adjustable speed;
frequent breakage of this spring;
an increase of the diameter of the apparatus due to the necessity to provide an annular chamber of large radial dimension between the periphery of the rod of the piston and the wall of the bore in which are mounted this latter and the said rod; an increase of wieght of the apparatus.

As a result of these inconveniences, it is often preferred to equip the hydraulic tools with a double acting ram the piston of which comprises two opposed working faces, or with a differential ram the piston of which likewise comprises two opposed working faces of non-equal surfaces (U.S. Pat. No. 4,109,381). Nevertheless, in this case, the construction of the apparatuses is complicated by the necessity to provide two distince conduits for supply of the hydraulic fluid under pressure coming from the source of supply of hydraulic fluid under pressure alternately against the one or the other of the said working faces, as well as a relatively complex double action distributor to regulate the circulation of the oil in these conduits and in the return direction.

The quantity of oil use for each inward-outward stroke of the piston is considerably greater than that which is required for a single action ram, which causes a lowering of the output of the secateurs or other hydraulic tool. Furthermore, the tools equipped with a differential ram can only operate in a hydraulic circuit with closed center. Finally, this complex construction of the tools leads to large dimensioning and to increase of weight of these latter which, in the case of secateurs for agricultural operations of cutting or harvesting influences in an unfavorable manner their maneuverability and the precision of said operations and are, furthermore, factors which fatigue the users.

OBJECTS OF THE INVENTION

One object of the present invention is to remedy the inconveniences, mentioned hereinabove, of the portable hydraulic tools already known, such as for example the hydraulic secateurs or shears comprising a single acting or double acting ram.

SUMMARY OF THE INVENTION

According to the invention, this object is achieved by reason of a construction and a method according to which the apparatuses are equipped with a single acting ram comprising a piston the return of which is ensured by the expansion of a compressible fluid such as, for example, a gaseous fluid, compressed and enclosed in a return chamber of variable volume, the said compressible fluid being submitted to a supplementary compression during the displacement of the said piston under the thrust of the hydraulic fluid under pressure coming from the hydraulic pressure source.

This construction and this method permit the obtaining of apparatuses and of various portable hydraulic tools such as, for example, hydraulic secateurs, of great constructional simplicity arising particularly from the possibility of using a single acting distributor and the presence of a single conduit coupling this distributor to the chamber bounded by the working face of the driving piston.

This great simplicity has as a corollary a certain and durable operation of the apparatus or tools. On the other hand, these latter can be made with reduced diameters and of an increased lightness with respect to the apparatus and tools of the same kind already known.

Another advantage of the construction and of the method according to the invention is that it permits a very simple construction of the distributor, the sealing joints of which do not undergo any high pressure, such that they are not submitted to any large force of deformation or extrusion, whilst there is obtained a perfect balancing of the movable member of the said distributor.

The tools can operate equally well in a hydraulic circuit with open centre as in a hydraulic circuit with closed centre.

Another advantage of the invention resides in the possibility of adjusting the speed of return of the driving piston and, consequently, the speed of re-opening of the blades, which permits to re-close them before their complete opening. In the advantageous application to secateurs, this possibility facilitates the operation of cutting or of harvesting, by reason of the fact that it favours the penetration of the cutting head of these latter into the vegetation.

BRIEF DESCRIPTION OF THE DRAWINGS

These and other objects, characteristics, and advantages, will appear from the following description and the accompanying drawings, wherein:

FIGS. 5 and 6 are views analogous to FIGS. 3 and 4 respectively illustrating the said forward and rearward parts in the positions corresponding to the closure of the blades;

FIG. 7 is a front view, partially in section,of the improved cutting head of this secateurs;

FIG. 8 is an axial sectional on a larger scale of the single acting hydraulic distributor of the said secateurs;

FIGS. 12 and 13 are view analogous to FIGS. 10 and 11 respectively, illustrating the said forward and rearward parts in positions corresponding to the closing of the blades;

DESCRIPTION OF THE PREFERRED EMBODIMENTS

Figure 1:
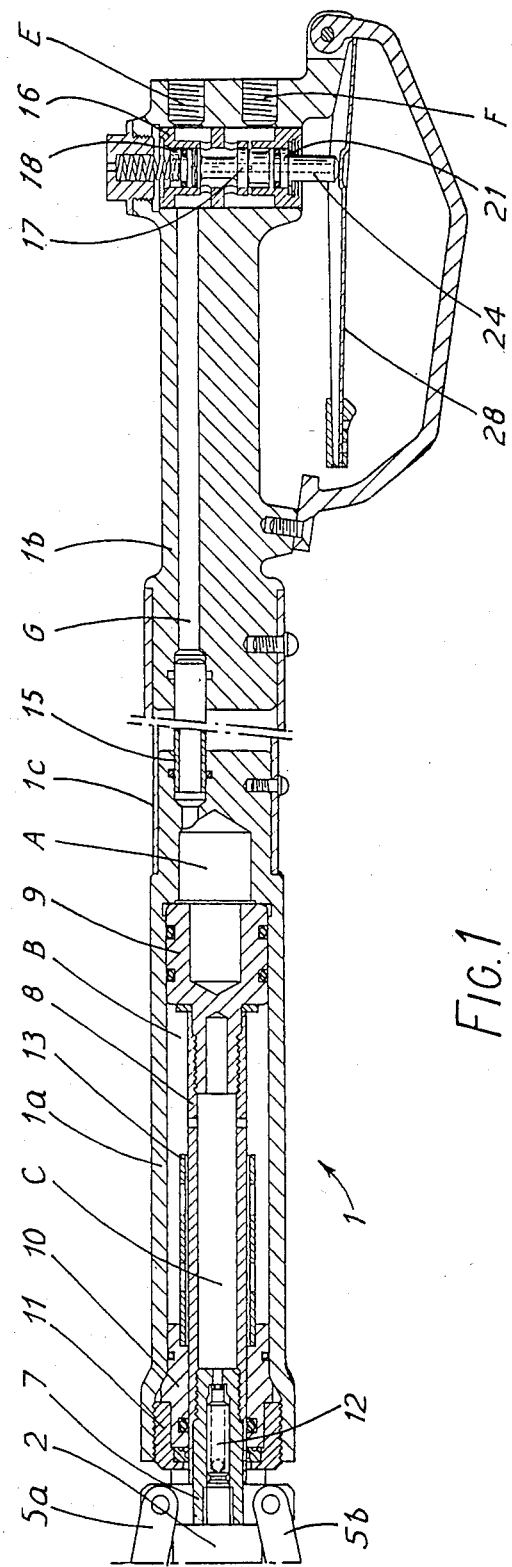
FIG. 1 is a partial view, in axial section, of a first example of construction of a hydraulic secateurs constructed in accordance with the invention, the different movable members of which are shown in a position corresponding to the opening of the blades.
Figure 2:
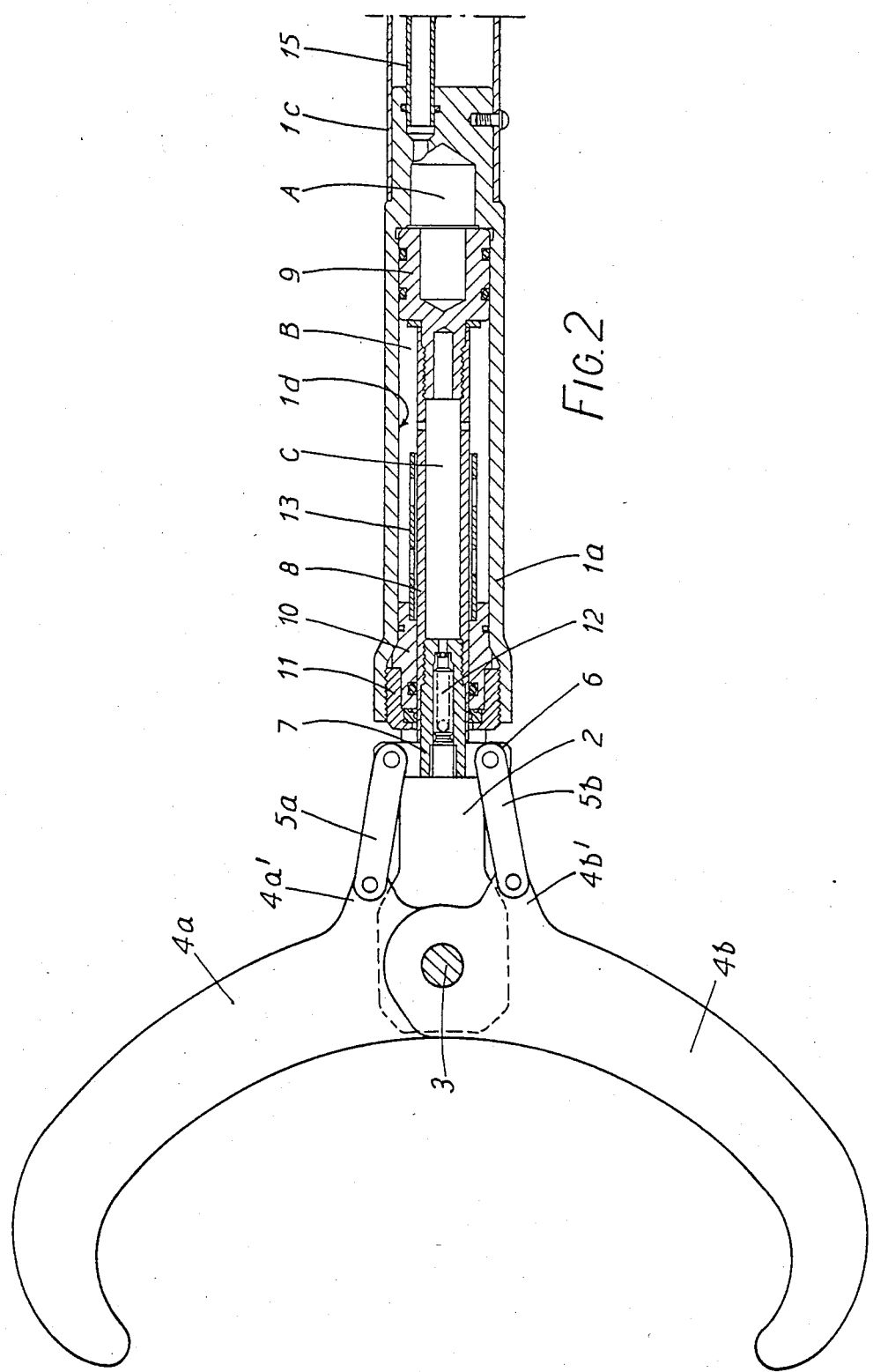
FIG. 2 is a partial view, in axial section, of the forward part equipped with the cutting head of this secateurs.
Figure 3:
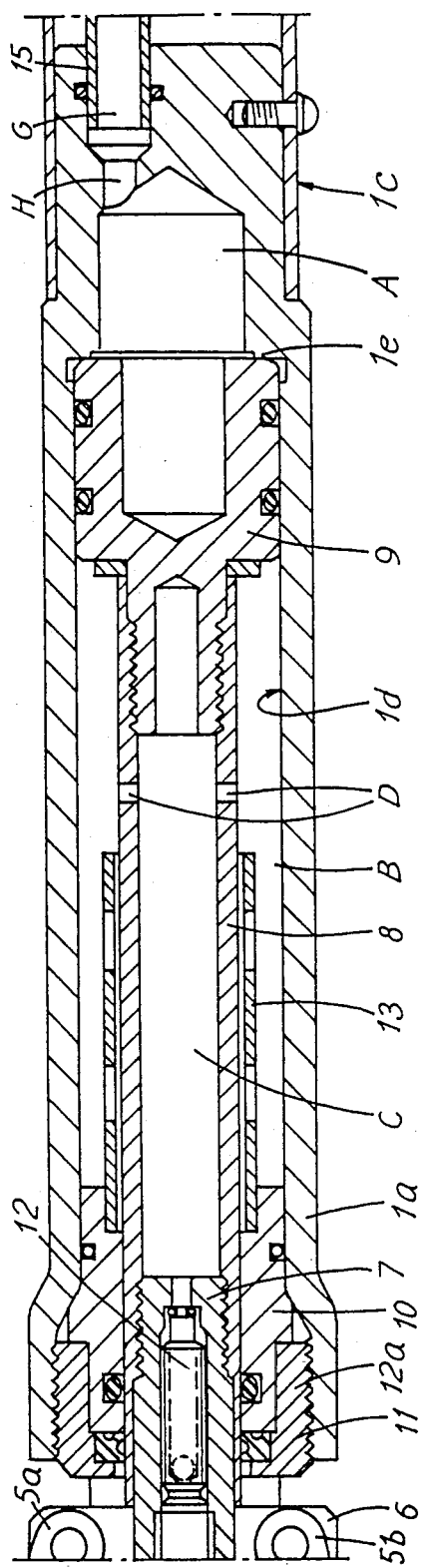
FIGS. 3 and 4 are partial views, in axial section and on a larger scale respectively of the forward part equipped with the single acting ram and of the rearward part in which is installed the hydraulic distributor, shown in positions corresponding to the opening of the blades.
Figure 4:
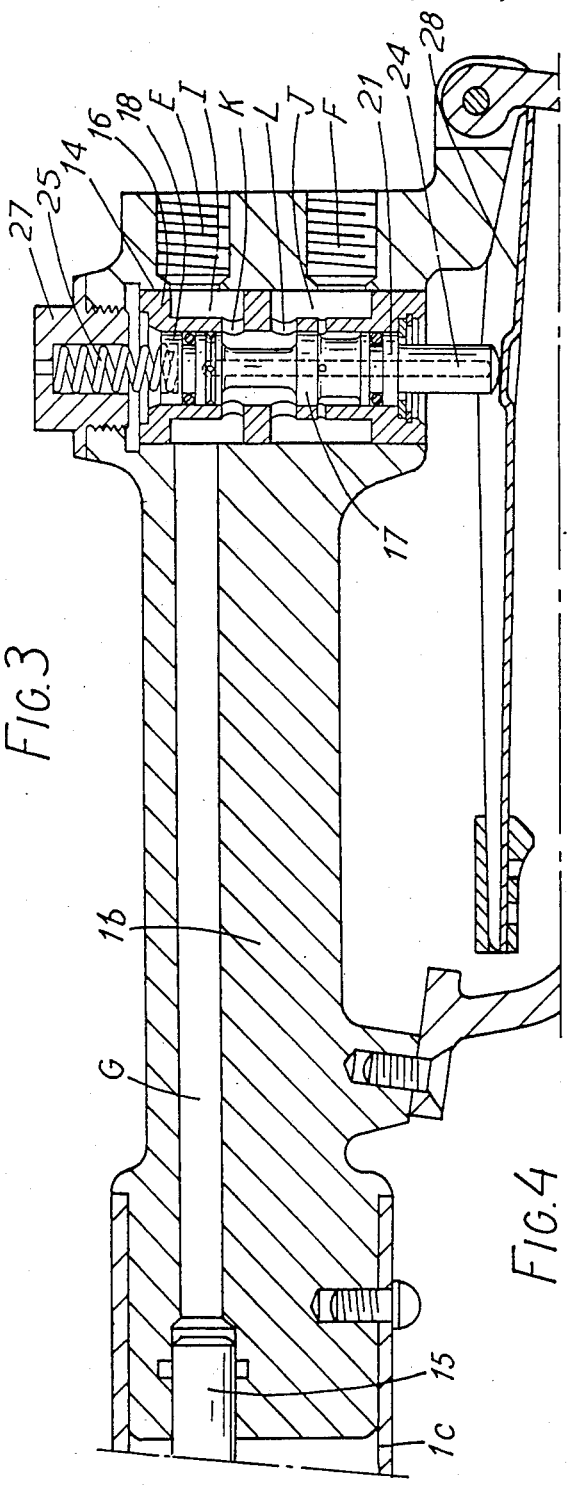

Reference is made to the said drawings in order to describe some interesting, although in no way limitative examples of carrying out of the method and of constructing portable hydraulic tools according to the invention.

Reference is made, in the disclosure which follows, to a particularly interesting application of the invention to the construction of hydraulic secateurs usable for cutting or harvesting in agriculture, arboriculture, viticulture or horticulture. Nevertheless it is stressed that the invention can be applied to the construction of various portable hydraulic apparatus or tools, such as, for example, shears for cutting the sheet metal of the bodies of vehicles in accidents, hydraulic tightening pincers etc.

FIGS. 1 to 6 illustrate an example of simplified carrying out of the invention applied to the construction of a hydraulic secateurs provided with two movable blades and a body of relatively great length, such a tool being suitable more particularly for the cutting and the harvesting of the fruits of palm trees such as date palsm, oil palms, etc.

This secateurs comprises a body designated as a whole by the reference 1 and composed of a forward casing 1a, a rearward casing 1b and a tubular extension 1c constructed in one or more parts and coupling the read end of the said forward casing and the rear end of the said rearward casing.

On the front end of the said forward casing there is installed a cutting head comprising a blade carrier 2 in the form of a cover on which are pivoted, by means of an axle 3, two blades 4a, 4b. These latter comprise, at a distance from the axle 3, a projection 4a', 4b' on which is pivoted one of the ends of a pair of connecting rods 5a, 5b likewise pivoted, by its opposite end, on a bracket 6 rigidly fast with a plug 7 itself fixed, for example by threading and in a fluid-tight manner, in the forward end of the hollow rod 8 of a driving piston 9. This piston provided with peripheral fluid-tight joints is housed, with a possibility of sliding in fluid-tight manner, in the axial chamber of the forward casing 1a and, more precisely, in a bore 1d formed in the central portion of this latter.

The rod 8 of the piston 9 slides, in fluid-tight manner in a guide 10 positioned, likewise in fluid-tight manner, in the forward end of the forward casing 1a, this guide provided with internal and peripheral annular fluid-tight joints being maintained in position by a ring 11 threaded in the said front end, and advantageously constituted by the rear end of the blade carrier 2.

The piston 9 bounds, by its opposed faces; on the one hand a chamber A communicating permanently with the inlet of hydrualic fluid coming from the source of hydraulic fluid and capable of being put into connection with the return for the said fluid; on the other hand, an annular return chamber B of variable volue, closing or capable of confining a compressed compressible fluid and, preferably a compressed gaseous fluid, and surrounding the piston rod 8.

The chamber B communicates with a reservoir chamber C constituted by the hollowbore of the piston rod 8, by means of radial holes D formed in the said rod. The chamber B is thus disposed about the chamber C and these two coaxial chambers permit the permanent disposition of a large volume available for the housing of compressed gaseous fluid, without lengthening of the tools, which avoids a too large compression of the said gaseous fluid, during advancing movements of the piston 9. The inlet of the chamber C is provided with a closure constituted by a valve 12 with valve element 12a, of a known kind, and installed in an axial bore of the cap 7.

A stop member limits the length of the stoke of the driving piston 9 forwardly, which determines the amplitude of pivoting of the blades. This stop member can advantageously be constituted by a perforated sleeve 13 housed in the axial bore of the forward casing and disposed about the rod 8, this sleeve being fast, at one of its ends, with the guide 10. A circular shoulder 1e formed in the forward casing serves as a stop against which abuts the working face of the piston, at the end of the return stroke.

The hydraulic distributor controlling the displacements of the piston 9 is installed in a transverse chamber 14 in the rearward casing 1b constituting the rear part of the body of the secateurs.

Into this chamber having its axis perpendicular to the axis of the piston 9 there open:

the feed or inlet opening of the fluid E formed in the rear part of the rearward casing 1b and arranged to be connectable, in any known manner, to a flexible tubing (not shown) itself coupled to a source of hydraulic fluid;

the return opening F, for example disposed below the former and likewise arranged to be able to couple to a flexible return tubing (not shown);

a longitudinal channel G communicating with the chamber A bounded by the working face of the piston 9; this longitudinal channel, in the manner of construction illustrated is constituted by a bore formed in the rearward casing 1b and by a rigid or flexible junction pipe 15 coupling, in fluid tight manner the forward end of the said bore and an orifice H provided in the rear portion of the forward casing 1a and opening into the chamber A.

The distributor comprises a cylindrical sleeve 16 provided with two wide annular peripheral throats I,J.

The throat I communicates permanently with the feed orifice E and with the channel G. It also communicates with the bore of the sleeve 16, by means of radial holes K formed in this latter The throat J communicates permanently with the return F and, according to the position of the distribution handle described hereinafter, with the bore of the sleeve 16 on the one hand through the radial holes L, and on the other hand by means of radial orifices M of more reduced diameter and disposed in front of the said radial holes, with respect to the internal end of the said sleeve.

In the bore of the sleeve 16 there is mounted, with a latitude for sliding, the movable member of the distributor which is advantageously constructed in a single piece and comprises a distribution handle 17 bounding, at the interior of the said bore, two annular chambers N, O. The distribution chamber N is in constant communication with the inlet E, through the passage K-I, and with the channel G, likewise through the passage K-I, the said chamber communicating thus also permanently with the chamber A bounded by the working face of the driving piston 9. According to the position of the distribution handle 17, it communicates or not with the return F, through the passage L-J. The chamber N is likewise bounded by a balancing piston 18 constituting the inner end of the movable member of the distributor. This balancing piston comprises two periperhal throats 18a, 18b. In the throat 18a nearest to its external end there is disposed an annular sealing joint 19, whilst the throat 18b nearest to the chamber N communicates with a channel P formed axially at the interior of the rod 20 of the said movable member, by means of at least one radial hole Q. On the other hand, the channel P communicates with the chamber O by means of at least one radial orifice R, the said chamber being constantly in relation with the return F, through the passage M-J.

The evacuation chamber O is likewise bounded by a cylindrical closure 21 constituted by a circular boss on the rod 20 in the vicinity of its external portion and comprising a peripheral throat 21a in which is disposed an annular sealing joint 22.

In rest position, the cylindrical closure 21 is pressed against a stop ring 23a immobilised by a circlip 23 installed in a circular throat formed at the inlet of the sleeve 16, from which emerges the external end 24 forming the trigger portion of the rod 20. This latter is submitted to the action of a compression spring 25 placed in abutment, at its opposed ends, on the one hand against the base of a blind hole 26 formed in the base of the said rod and, on the other hand, against the base of a stopper 27 screwed in the threaded end of the bore 14 opposite to that end from which the trigger portion 24 emerges, the said spring tending to urge this latter into its emerging portion.

On the rear part of the rearward casing 1b there is pivoted the operating lever 28 of the secaturs, abutting against the trigger portion 24 and the pivoting of which towards the interior permits the pushing of this latter agains the opposing force exerted by the spring 25.

The operation of this secateurs will be readily understood:

By means of the valve 12 and with the aid of the necessary material (compressor, bottle of compressed gas, manual pump etc.) a compressible fluid is introduced and compressed in the coaxial chambers C and B, which has the effect of pushing the piston 9 towards the rear and of maintaining it jammed against the shoulder 1e. The compressible fluid used is advantageously a gaseous fluid, for example compressed air or, preferably, a neutral compressed gas which does not dissolve, or dissolves only to a small extent, in oil such as nitrogen, argon etc.

In rest position corresponding to the opening of the blades (FIGS. 1 to 4 and 8), the inlet E for hydraulic fluid communicates with the return F by means of the passage I-K-N-L-J (functioning as an open centre hydraulic circuit). The hydraulic fluid, such as oil, likewise fills the channel G and the chamber A which, in this situation, has its minimum volume, by reason of the withdrawn position of the piston 9.

When the movable member 17-18-20-21 of the distributor is pushed, by means of the lever 28 acting on the trigger portion 24, the new position of the distribution handle 17 of the said movable member prevents the circulation of the oil through the radial holes L and thus interrupts the communication between the inlet and the return. The pressure of the oil exerted against the working face of the piston 9 being then greater than that of the compressed gas enclosed in the chamber B and C and applied on the opposite face of the said piston, this latter is pushed forwardly (FIGS. 5 and 6), which causes pivoting and closure of the blades.

It will be seen that, in this position, the pressure of the oil is not applied on the joints 19 and 22 of the movable member of the distributor. In effect, the fluid-tightness between: on the one hand, the cylindrical surfaces of the portions of the balancing piston 18 and of the closure 21 disposed in the inner side of the joints 19 and 22 respectively, and—on the other hand, the bore of the sleeve 16 is obtained principally by the quality of the fitting of the cylindrical surfaces in contact, such that the said joints do not undergo any pressure. Nevertheless, if there is a loss of oil about the balancing piston 18, this oil is collected in the throat 18b and, by means of the passage Q-P-R-O-M-J, it is fed back to the return F. The joint 19 of the balancing piston thus does not support any pressure. On the other hand, the joint 22 with which the cylindrical closure 21 is provided is not itself submitted to any pressure because the chamber O bounded by the said closure communicates permanently with the return. It is thus possible to use very large pressures, because of the fact that the joints do not undergo any deformation no matter what the position of the movable member of the distributor may be.

When the lever 28 is released, the movable member of the distributor is pushed back by the spring 35, so that the distributor handle 17 occupies a position permitting the passage of the oil through the radial holes L, which re-establishes communication between the inlet E and the return F. The low pressure in the chamber A becomes lower than that which is present in the chambers B and C, so that the piston 9 is pushed towards the rear by the expansion of the compressed gas contained in these latter and earlier submitted to a complementary compression during the displacement forwardly of the said piston, this causing the pivoting and reopening of the blades.

The speed of return of the piston and thus the speed of pivoting of the blades into the opening position are related to the value of the compression of the compressed gas enclosed in the chambers B and C. It will be understood that, by the choice of the value of compression of this gas, it is possible to adjust easily and in a convenient manner the speed of reopening of the blades.

There is illustrated in FIG. 7 a very advantageous arrangement of the cutting head of the secateurs.

According to this manner of construction, a ball thrust member 29a, 29b in installed on the axle 3, at each side of the pair of blades 4a,4b, between the arms 2a,2b of the ocver constituting the rear portion of the blade carrier 2. The axle 3 is constituted by a bolt permitting the maintaining of the blades 4a, 4b in contact one with the other. In order that the pressure tending to urge the blades one against the other shall be always sufficient to obtain a clean cut, without neverthless opposing the pivoting of the movable blade or blades, this pressure is applied to the pair of blades by means of a resilient element. In a preferred and advantageous manner, this resilient element is constituted by a Belleville 30 washer, for example interposed between the internal face of the nut 3a of the bolt 3 and a ring 59 mounted, with a capability of axial translation on the rod of the said bolt, in a recess 2b' of one of the arms (arm 2b) of the blade carrier, this movable ring being itself interposed between the said Belleville washer and one of the ball thrust members (ball thrust member 29b).

FIGS. 9 to 13 illustrate a second example of carrying out the invention applied to the construction of another type of hydraulic secateurs useful for the standard oeprations of cutting and harvesting in arboriculture, viticulature and horticulture.

This secateurs comprises a hollow body 31 the rear portion of which is shaped to serve as a handle and on the rear portion of which is installed a cutting head comprising a blade carrier 32 on which is fixed a hook or fixed blade 33. On this hook there is pivoted, by means of an axle 34, the movable blade comprises an extension or lever 35a having an open recess 36 traversed by a driving slide 37 carried by the rear end, in the form of a cover 58a, of a stopper 58 installed in fluid-tight manner in the forward end of a hollowed rod 38. During the pivotings of the movable blade 35, the driving slide 37 slides in the recess 36. This arrangement facilitates the coupling of the movable blade and the rod, by eliminating the employment of an intermediate member.

On the cylindrical rear end 38b, of more reduced diameter, of the rod 38 there is fastened a driving piston 39 provided with annular peripheral sealing joints and disposed, with a capability of fluid tight sliding, in a bore of the forward portion of the body 31. The working face of this piston bounds a chamber a of variable volume, whilst its opposite face bounds an annular chamber b of variable volume surrounding the rod 38. This latter can slide, in fluid tight manner, in a fixed guide 40, preferably in a demountable manner in the forward part of the bore of the body 31, this guide being provided, internally and externally, with annular fluid tight joints.

In the bore of the rod 38 is positioned a free piston 41 equipped with annular peripheral fluid tight joints. This free piston bounds, at the interior of the said bore, on the one hand by its forward face a chamber c and, on the other hand by its rearward face a second chamber d which communicates permanently with the annular chamber b by means of at least one orifice e formed in the cylindrical wall of the rod 38. The concentric chambers b and d constitute, with the orifice e which provides communication between them, an enclosure of variable capacity to contain an incompressible transmission fluid, as is explained hereinafter.

A valve 42 is installed in front of the rod 38, in an axial bore of the stopper 58, at the inlet of the chamber c, this valve permitting the introduction of a compressible fluid, such as air, nitrogen, argon, etc. into the said chamber.

The rear end of the rod 38 comprises an axial bore f disposed in alignment with an axial orifice g formed in the piston 39 and communicating with the chamber a. In the bore f is positioned a non-return valve 43 and a compression spring 44 tending to maintain the said valve against the forward edge of the orifice g. In the bore f there open two radial apertures h opening in the lateral surface of a frosto-conical portion 38c of the rod 38 in front of its rear cylindrical extremity of reduced diameter engaged in the piston 39, that is to say in the immediate proximity and in front of this latter. This conical surface serves as a seating for an annular valve 45 having a complementary conical bearing surface. This valve 45 is provided with peripheral grooves 45a orientated parallel to its axis, and it is kept on it seating by a resilient means advantageously constituted by a Belleville washer 46 interposed between its rear face and the forward face of the piston 39.

At the forward end of the annular chamber b is fixedly disposed a stop ring 47 having a double function; on the one hand to limit the stroke of the piston 39 towards the front and, on the other hand, to lift the valve 45 from its seating when the said piston arrives at the end of its advancing stroke.

A purging orifice 48 communicating with the read end of the annular chamber b is provided in the body 31, this orifice being equipped with a fluid tight closure element.

The hydraulic distributor is installed in a transverse blind recess 49 formed in the rear part of the body 31. A conduit i, constituted by a longitudinal opening formed in the rear part of the body, provides a communication between the chamber a bounded by the working face of the driving piston 39 and the blind transverse recess 49 into which there also open:—on the one hand, the feed or inlet opening j of the hydraulic fluid under pressure:—on the other hand, the return orifice k.

According to the example illustrated, the rear end of the body 31 is arranged to receive a device (not shown) permitting the dismountable coupling, in a convenient and rapid manner, of the secateurs with flexible coaxial feed and return pipes coupled to a source of hydraulic fluid under pressure, such a dismountable coupling device being described in the document FR-A-2419453.

The distributor comprises a cylindrical sleeve 50 installed fixedly in the recess 49, a movable distribution member mounted with a capability of sliding in the axial bore of the said sleeve, and a compression spring 51 interposed between the base of the said recess and the base of an axial cavity formed in the internal portion of the same member.

The cylindrical sleeve 50 comprises two peripheral annular throats l,m. The throat l communicates permanently with the inlet j, and likewise with the bore q of the sleeve by means of radial holes n the inlet of which is placed in the rear part of the said throat, with respect to the external end of the said sleeve. The throat m communicates directly with the conduit i, and also with the bore q of the sleeve, by means of radial holes o disposed behind the holes n.

The movable member of the distributor is advantageously manufactured in a single piece and comprises a distribution handle 52 bounding, with a balancing piston 53, an annular chamber p which is in constant relationship with the inlet j, through the passage n-1. The said movable member again comprises a trigger portion or pusher element 54 constituted by one of its ends emerging from the inlet of the sleeve and it is maintained in the interior of this latter by means of a retention washer 55 immobilised by a circlip 56 positioned in an internal circular groove formed near to the inlet of the said sleeve and against which bears the external face of the balancing piston, under the pressure of the spring 51.

The mounting of the hydraulic distributor in a blind recess and the supporting of the movable member of the said distributor by means of a circlip positioned at the inlet of the fixed sleeve of this alter, permits the obtaining of very good fluid tightness and greatly facilitates the production of the housing of the said distributor and the placing in position of its member components.

On the rear part of the body 31 is pivoted the manipulating lever 57 of the secateurs bearing against the external end of the trigger portion 54.

There is described hereinafter the manner of use and the operation of the secateurs which has just been described.

The secateurs is first of all prepared for operation. For this purpose, the chamber c is filled with a compressed gaseous fluid, by means of the valve 42 and with the aid of any necesasry means, which has for its effect to support or to push back the free piston 41 into the base of the bore of the piston rod 38, the purging orifice 48 being open for the evacuation of the air which is in the chamber d. The secateurs being connected to the source of hydraulic fluid under pressure, the hydraulic fluid under pressure such as oil is then sent, by operating the distributor, against the working face of the driving piston 39 which becomes pushed back forwardly at the same time as the rod 38 and the valve 45 disposed in front of the said piston. At the end of the stroke, the stop 47 causes the lifting of the valve 45. As a result of the opening of the radial openings h, the non-return valve 43 is lifted off its seating and the oil enters the chambers b and d which have their minimum volume. These chambers fill with oil, which scavenges the air therein. When the oil comes out of the purge orifice 48, this latter is closed by means of its fluid tight closure. The pressure which is then created in the chambers b and d has the effect of pushing back the free piston 41 forwardly, whilst increasing the volume of the chamber d and submitting the compressed gas enclosed in the chamber c, of which the volume diminishes, to a supplementary compression. When this compression balances itself with the pressure of the hydraulic fluid under pressure, the free piston stays still and teh valve 43 closes the inlet orifice g of the said hydraulic fluid in the enclosure constituted by the chambers b and d, and the orifice e which provides a communication between these latter.

The secateurs is then ready to operate and, as is described in detail hereinafter, by releasing the operating lever 57, there is obtained the return towards the rear of the two pistons and the opening of the blades. In rest position corresponding to the opening of the blades (FIGS. 9 to 11), the hydraulic fluid under pressure coming from the inlet j fills the annular chamber p, by means of the passage n-1, but the position of the distribution handle 52 prevents any communication:—on the one hand, with the chamber a bounded by the working face of the driving piston 39;-on the other hand with the return k (operation in hydraulic circuit with closed centre).

Furthermore, the chamber a communicates with the return through the passage i-m-o-q and the base of the bore 49.

When the movable member 52-53-54 of the distributor is pushed back, by means of the lever 57 bearing on the trigger portion 54, against the opposing force of the spring 51, the new position of the distribution handle 52:—permits the arrival of the oil under pressure in the chamber a through the passage 1-n-p-o-m-i; —interrupts the communication between the chamber a and the return k.

The arrival of the oil under pressure in the chamber a causes the displacement forwardly of the driving piston 39 and of the rod of the piston 38, which causes pivoting of the movable blade 35 into the position of closure of the blades corresponding to the action of cutting by the secateurs (FIGS. 12 and 13). The displacement of the driving piston forwardly has for its result to apply a pressure on the oil contained in the chambers b and d communicating throught the orifice e, the said chambers having, before this displacement, their maximum and minimum volumes respectively.

This pressure reacts on the rear face of the free piston 41 which is pushed forwardly and applies a supplementary compression to the compressible and compressed gas enclosed in the chamber c.

As indicated above, the valve 45 is lifted from its seating, against the opposed force of the Belleville washer 46, when it meets the stop 47. In this manner, the very slight losses of oil inevitable in any ram system are automatically compensated for by the entry, into the chambers b and d, of a corresponding quantity of oil coming from the chamber a, through the passage g-f-h. In effect, when the volume of oil contained in the chambers b and d diminishes, the pressure exerted on the rear face of the non-return valve 43 permits it to be lifted from its seat when the valve 45 is lifted from its own, which permits the entry of a compensating quantity of oil into the said chambers, until the pressures balance in the said chambers and in the chamber c. In this manner, the volume of oil contained in the chambers b and d is always constant.

Figure 9:
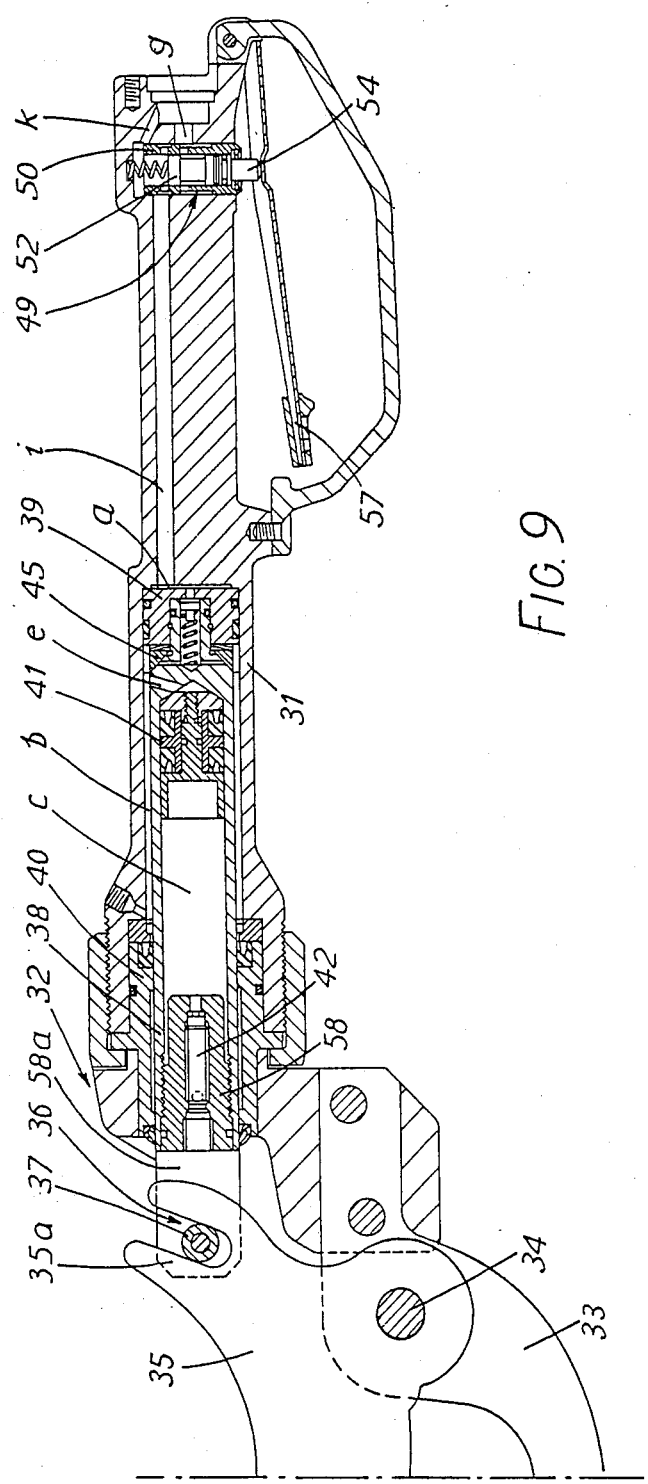
FIG. 9 is a view in axial section of another manner of construction of a hydraulic secateurs constructed in accordance with the invention, the blades of which have been only partially shown and the different movable members of which are illustrated in positions corresponding to the opening of the said blades.
Figures 10, 11:
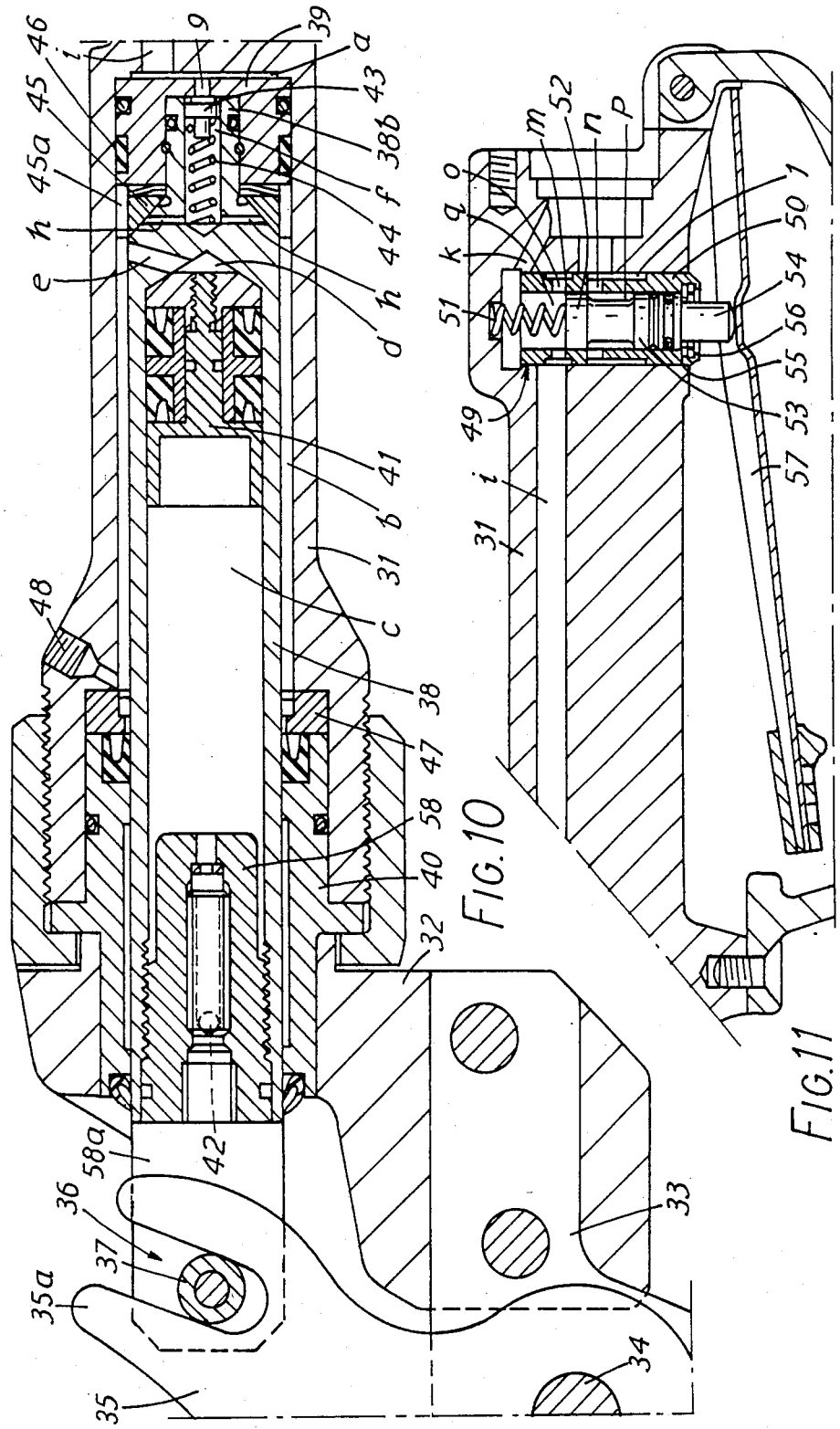
FIGS. 10 and 11 are partial views, in axial section and on a larger scale respectively of the forward part equipped with the single acting ram and of the rearward part in which is installed the hydraulic distributor, shown in the position of opening of the blades.

When the lever 57 is released, the movable member 52-53-54 of the distributor is pushed back by the spring 51 and the distribution handle 52 comes back to its previous position wherein:

it interrupts the communication between the inlet j and the chamber a;

it re-establishes the communication between the chamber a and the return k, through the passage i-m-o-q and the base of the bore 49. As a result of the disappearance of the inlet pressure on the working face of the driving piston 39, the compressed gas obtained in the chamber c can de-compress, and this decompression has the effect of pushing back the free piston 41 toward the rear. Whilst returning, this latter drives back the oil contained in the chamber d, this oil passing into the annular chamber b and causing the returning of the piston 39 and of the rod 38, which causes the pivoting of the movable blade 35 into the open position (FIGS. 9 to 11).

Figure 14:
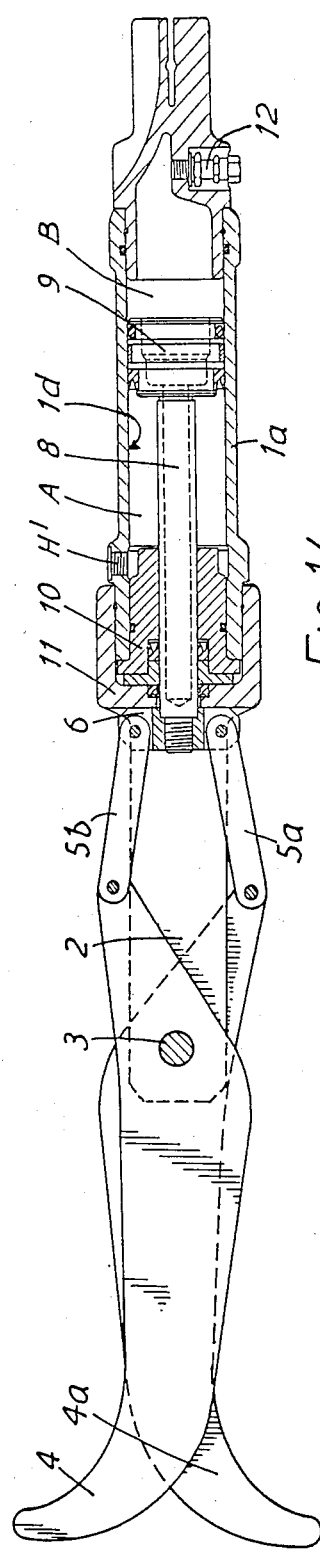
FIG. 14 is a view in axial section of another manner of construction of a hydraulic secateur analogous to that which is illustrated in FIGS. 1 to 8 and of which only the cutting tool proper is shown, the various movable members of this tool being shown in positions corresponding to the closed of its cutting blades.
Figure 15:
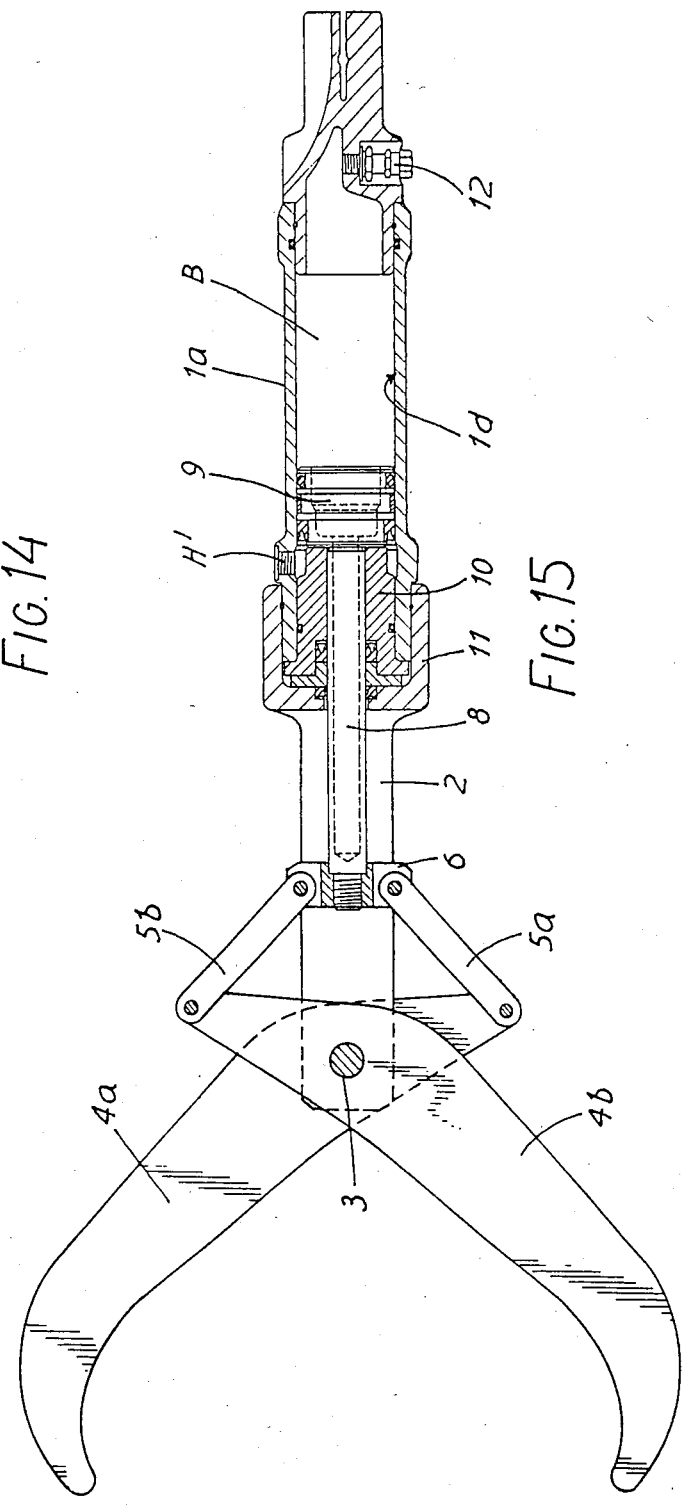
FIG. 15 is a view in axial section of this cutting tool the movable members of which are shown in positions corresponding to the opening of its blades.
Figure 16:
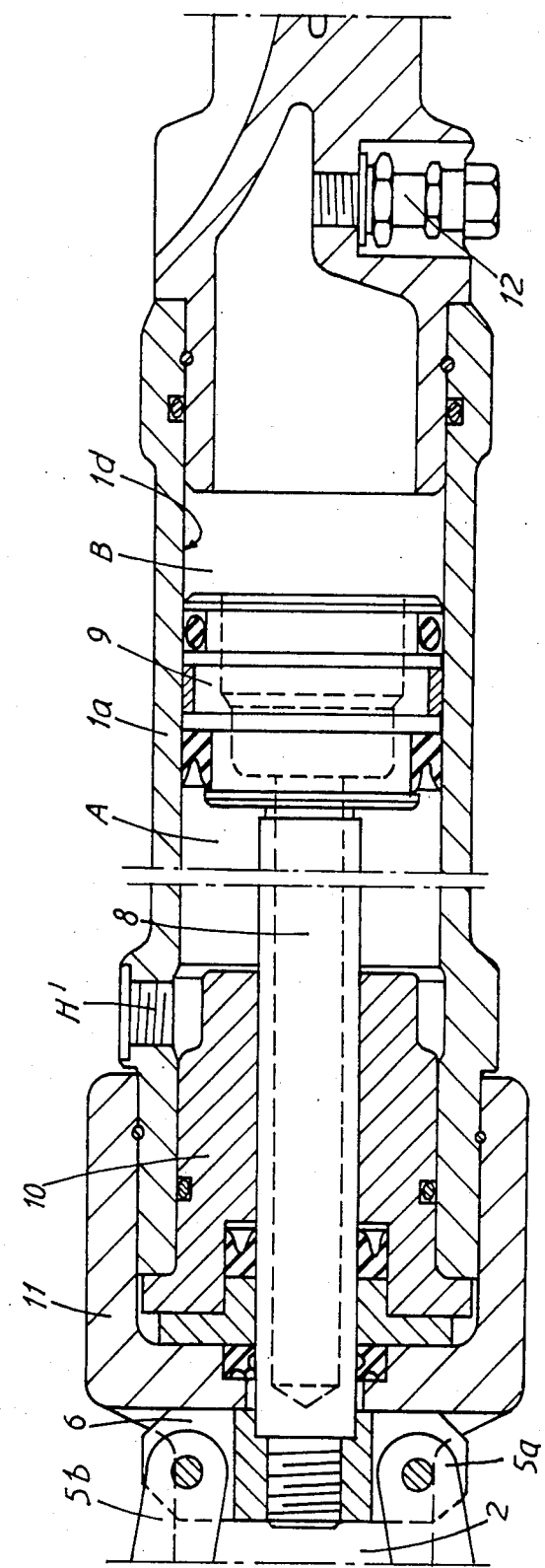
FIG. 16 is a partial view, in axial section and on a larger scale of FIG. 14.

There is shown, in FIGS. 14 to 16, another manner of construction of the cutting tool proper of a secateurs of a type analogous to that which is illustrated in FIGS. 1 to 8.

For this reason the members of this cutting tool identical to or having the same functions as those of the cutting tool of the secateurs illustrated in FIGS. 1,2,3, and 5, are designated by the same references. On the other hand, for purposes of being concise, the hydrualic distributor housed in the operating handle, the junction pipe and the extension tube coupling, respectively, the said distributor and the said handle to the cutting tool are not shown.

This economical and simplified manner of construction differs from that which is illustrated in FIGS. 1 to 8 principally by the fact that the return chamber B enclosing, or capable of enclosing, the compressed gaseous fluid, is bounded by the large face of the driving piston 9 and disposed in the rear part of the forward casing 1a, whilst the hydraulic pressure chamber A is bounded by the small working face of the said piston and disposed about the rod 8, in thr forward part of the said casing. The valve 12 permitting the introduction of the compressed gaseous fluid into the return chamber B is thus installed in a housing formed in the rear part of the casing 1a and opening into the said chamber, whilst the orifice H' for entry of hydraulic fluid into the pressure chamber A is formed in the forward part of the said casing.

By means of such a construction there is obtained a better fluid tightness, to the compressed gaseous fluid contained in the return chamber B.

I claim:

1. In a portable hydraulic tool having:
   (a) a structure, including a hollow body defining a bore,
   (b) a driving piston slidable in fluid-tight manner in said bore,
   (c) means in said bore defining, with a working face of said piston, a working pressure chamber to receive a flow of hydraulic fluid under pressure thereinto for effecting a working stoke of said piston,
   (d) a piston rod connected to said piston,
   (e) at least one operating member, of the tool, movably mounted on said structure and connected to said piston rod,
   the improvement which comprises:
   (i) means defining a return chamber bounded by a return face of said piston and the volume of which return chamber decreases as said driving piston is progressively displaced during its working stroke, and
   (ii) a resiliently compressible fluid in said return chamber whereby upon reduction of the pressure of the hydraulic fluid in the working pressure chamber to less than that of the compressible fluid in the return chamber, the piston is caused to effect a return stroke by expansion of said compressible fluid a cutting head including a forward body portion,
   a push-rod connected at one end to one face of the piston and extending out of the hollow body,
   shaft means engaged in said forward portion,
   cutting means comprising a pair of abutting pivotable blades carried by said shaft means,
   a pair of ball thrust members on said shaft means each abutting a respective blade,
   resilient means for adjustably biasing said ball thrust members against said blades to maintain said blades in abutting relation,
   and means coupling said driving piston to at least one of the blades to effect a cutting stroke and a return stroke.

2. A portable hydraulic tool, as claimed in claim 1, wherein said return chamber is defined between said hollow body and said piston.

3. A portable hydraulic tool, as claimed in claim 1, wherein said piston rod bounds an internal reservoir chamber, said chamber communicating with said return chamber.

4. A portable hydraulic tool, as claimed in claim 1, wherein said piston has a return stroke face larger than said working face, said return chamber being bounded by said return stroke face, and said pressure chamber being defined about said piston rod and being bounded by said working face.

5. A portable hydraulic tool, as claimed in claim 1, comprising a free piston having a first face and a second face, said free piston being slidable in fluid-tight manner in said return chamber with said first face bounding said return chamber, said hollow body and a return face of said driving piston and said second face of said free piston together bounding on a fluid-tight enclosure to receive a constant volume of an incompressible transmission fluid.

6. A portable hydraulic tool, as claimed in claim 5, wherein said return chamber is a bore in said piston rod, and wherein said fluid-tight enclosure is constituted by the combination of an annular chamber defined between said hollow body and said piston rod, a chamber within said piston rod and bounded by said second face of said free piston, and at least one orifice providing a permanent communication between said annular chamber and said piston rod chamber.

7. A portable hydraulic tool, as claimed in claim 5, comprising fluid-less compensating means for the automatic introduction, in the course of operation of the said tool, of quantities of transmission fluid into said enclosure to compensate for any loss of fluid therefrom.

8. A portable hydraulic tool, as claimed in claim 7, wherein said comprensating means comprise:
   (i) means in said driving piston defining an orifice opening at its working face,
   (ii) means in said piston rod defining a bore communicating with said orifice,
   (iii) an non-return valve in said bore adapted to seat onto said orifice-defining means,
   (iv) spring-loading means in said bore abutting said piston rod and said non-return valve to urge said valve onto its seating,
   (v) means in said piston rod defining a plurality of radial openings between said bore and a fructoconical seating surface on said piston rod adjacent to and facing towards said piston,
   (vi) an annular valve element disposed between and axially movable between said rod and said piston and having a complementary frusto-conical surface to abut said frusto-condical seating surface of said rod, (vii) resilient means disposed between and abutting said piston and said annular valve element to urge said element against it seating, (viii) a stop disposed in said hollow body bore and positioned to be abutted by said annular valve element, as said driving piston approaches the end of its working stroke, to lift said annular valve element off its seating.

9. A portable hydraulic tool, as claimed in claim 5, comprising means defining a purging orifice opening into said fluid-tight enclosure, and a removable fluid-tight closure for said purging orifice.

10. A portable hydraulic tool, as claimed in claim 1, comprising a cutting head including:

(i) a forward body portion (ii) a first cutting blade carried fixedly by said body portion (iii) a second cooperating cutting blade pivotably carried by said body portion and coupled to said driving piston, said second blade including an open-ended recess, (iv) a driving slide carried by said driving rod, said slide traversing said blade recess, 11. A portable hydraulic tool, as claimed in claim 10, for operation in a hydraulic circuit with closed center, comprising a single-acting distributor including a fixed sleeve having means defining peripheral throats and radial holes communicating with said throats for circulation of hydraulic driving fluid and a distribution member slidable in said sleeve, said distributor being disposed ina blind traverse hole defined in said body.

12. A portable hydraulic tool, as claimed in claim 1, comprising a distributor installed in a transverse recess formed in a rear part of said body, said distributor comprising:

(i) a fixed sleeve having peripheral throats and radial holes communicating with said throats for circulation of hydraulic driving fluid, and (ii) a movable distribution member disposed slidably in said sleeve, wherein said movable member is retained in said sleeve by means of a circlip positioned in an annular groove formed near to the inlet of the sleeve.

13. A portable hydraulic tool, having:

(a) A single acting ram includign a driving piston, a piston rod connected to said piston, a hollow body having means defining a bore, said piston being slidable in fluid-tight manner in said bore and the working stroke of said piston being carried out by the thrust of hydraulic fluid under pressure in a pressure chamber of said bore and acting on a working face of said piston, (b) at least one movable operating member, for said tool, connected to said piston rod, (c) means defining a return chamber the volume of which decreases when said driving piston is displaced in a working stroke by said thrust of hydraulic fluid under pressure, said return chamber containing a compressible fluid under pressure such that, when the thrust exerted by said hydraulic fluid on said piston becomes less than the thrust exerted on said piston by said compressible fluid, said piston is caused to perform its return stroke by expansion of said compressible fluid, (d) a cutting head including a foward body portion, an axle bolt engaged in said forward portion and carrying a nut, two abutting pivotable blades carried pivotably by said axle bolt and coupled to said driving piston, a pair of ball thrust members on said axle bolt each abutting a respective pivotable blade, a ring axially slidable on said axle bolt and abutting one of said ball thrust members, and a resilient thrust member engaged between said nut and ring.

14. A portable hydraulic tool having:

(a) a single acting ram including a driving piston, a piston rod connected to said piston, a hollow body having means defining a bore, said piston being slidable in fluid-tight manner in said bore and the working stroke of said piston being carried out by the thrust of hydraulic fluid under pressure ina pressure chamber in said bore and acting on a working face of said piston, (b) at least one movable operating member, for said tool, connected to said piston rod, (c) means defining a return chamber the volume of which decreases when said driving piston is displaced in a working stroke by said thrust of hydraulic fluid uner pressure, said return chamber containing a compressible fluid under pressure such that, when the thrust exerted by said hydraulic fluid on said piston becomes less than the thrust exerted on said piston by said compressible fluid, said piston is caused to perform its return stroke by expansion of said compressible fluid, and (d) a distributor disposed in a rear part of said body and comprising a fixed sleeve having peripheral throats and radial holes communicating with said throats for circulation of hydraulic fluid, a distribution member movable in said sleeve, said distribution member having:

a trigger portion a cylindrical closure provided with an annular peripheral sealing joint, a distribution handle, and a balancing piston provided with an annular peripheral sealing joint, said distribution handle and said balancing piston bounding a distribution chamber in constant communication with an inlet for driving fluid and a chamber bounded by the working face of the driving piston, said distribution chamber being capable of being placed, or not, in communication with a return outlet for driving fluid by means of said distribution handle, said distribution handle bounding with said cylindrical closure an evacuation chamber in constant relation with said return outlet through at least one radial orifice formed in said sleeve, said balancing piston comprising an annular peripheral throat disposed between its internal face and its annular sealing joint, said throat communicating with said evacuation chamber through an axial channel provided in said movable distribution member, at least one radial orifice coupling said axial channel and said peripheral throat, and at least one radial orifice coupling said axial channel and said evacuation chamber.

* * * * *